US006302432B1

(12) United States Patent
Magoteaux et al.

(10) Patent No.: US 6,302,432 B1
(45) Date of Patent: Oct. 16, 2001

(54) DEFLECTION TAB BASEPLATE FOR AN AIRBAG INFLATOR

(75) Inventors: David G. Magoteaux, Mesa; Frank P. Leonelli, Jr., Gilbert, both of AZ (US)

(73) Assignee: TRW, Inc., Lyndhurst, OH (US)

( * ) Notice: Subject to any disclaimer, the term of this patent is extended or adjusted under 35 U.S.C. 154(b) by 0 days.

(21) Appl. No.: 09/416,605

(22) Filed: Oct. 12, 1999

(51) Int. Cl.$^7$ ................................................. B60R 21/20
(52) U.S. Cl. ................................. 280/728.2; 280/731
(58) Field of Search ........................... 280/728.2, 731, 280/728.3, 732

(56) References Cited

U.S. PATENT DOCUMENTS

| | | | |
|---|---|---|---|
| 5,064,218 | * 11/1991 | Hartmeyer | 280/743 |
| 5,141,247 | * 8/1992 | Barth | 280/728 |
| 5,152,549 | * 10/1992 | Aird | 280/728 |
| 5,320,379 | 6/1994 | Burnard et al. . | |
| 5,409,256 | 4/1995 | Gordon et al. . | |
| 5,518,266 | 5/1996 | O'Docherty et al. . | |
| 5,540,460 | 7/1996 | Wipasuramonton . | |
| 5,562,301 | 10/1996 | Lutz . | |
| 5,577,763 | 11/1996 | Cuevas . | |
| 5,692,771 | * 12/1997 | Milne, III et al. | 280/728.2 |
| 5,697,637 | 12/1997 | Milne, III . | |
| 5,782,481 | * 7/1998 | Magoteaux | 280/728.2 |

* cited by examiner

Primary Examiner—Peter C. English
Assistant Examiner—Christopher Buchanan
(74) Attorney, Agent, or Firm—Tarolli, Sundheim, Covell, Tummino & Szabo L.L.P.

(57) ABSTRACT

A vehicle occupant protection apparatus 10 includes an inflatable vehicle occupant protection device 14, an inflator 12, a retainer 100, a reaction plate 70, and a fastener 110. The inflatable vehicle occupant protection device 14 has a portion 41 defining an inlet opening 144. The inflator 12 has a housing 60 and a mounting flange 64 that projects from the housing 60. The housing 60 extends through the inlet opening 144 into the vehicle occupant protection device 14. The retainer 100 is located in said vehicle occupant protection device 14 and extends circumferentially around the housing 60. The reaction plate 70 has a base portion 72 and at least one spring finger 80 attached to the base portion 72. The spring finger 80 has a support surface 82 for engaging a first side 68 of the mounting flange 64. The fastener 110 secures the retainer 100, the protection device 14, and the reaction plate 70 together as an assembly. A first surface portion 106 of the retainer 100 clamps the portion 41 defining the inlet opening 144 against a second side 66 of the mounting flange 64. A second surface portion 107 of the retainer 100 clamps the portion 41 defining the inlet opening 144 against the base portion 72 of the reaction plate 70.

17 Claims, 7 Drawing Sheets

DEFLECTION TAB BASEPLATE FOR AN AIRBAG INFLATOR

FIELD OF THE INVENTION

This invention relates to an apparatus for protecting an occupant of a vehicle and, more particularly, to an apparatus including an inflatable vehicle occupant protection device.

BACKGROUND OF THE INVENTION

An inflatable vehicle occupant protection device, such as an air bag, is inflated upon the occurrence of a vehicle collision. The air bag is part of an apparatus which further includes a collision sensor and an inflator. The collision sensor senses vehicle conditions that indicate the occurrence of a collision. When the collision sensor senses a collision-indicating condition of at least a predetermined threshold level, the inflator is actuated. The inflator then emits inflation fluid which inflates the air bag into the vehicle occupant compartment to help protect an occupant of the vehicle from forcefully striking parts of the vehicle as a result of the collision.

An air bag and an inflator are typically assembled together as parts of an air bag module. The air bag module is located in the vehicle adjacent to the vehicle occupant compartment. For example, a passenger side air bag module is typically located in the vehicle instrument panel. A driver's side air bag module is typically located on the vehicle steering wheel. In addition to the air bag and the inflator, a driver's side air bag module typically includes a retainer and a cover. The retainer secures the air bag and the inflator together. The cover conceals airbag and inflator from the vehicle occupant compartment, and includes at least one deployment door which extends over the air bag.

When inflation fluid emitted from the inflator begins to inflate the air bag, it moves the air bag outward against the deployment door. The deployment door is ruptured by the force of the fluid pressure in the air bag, and is moved out of the path of the air bag as the inflation fluid continues to inflate the air bag outward into the vehicle occupant compartment. This inflation generates a force which requires the module to be mounted to the vehicle securely.

SUMMARY OF THE INVENTION

In accordance with the present invention, an apparatus for protecting a vehicle occupant includes an inflatable vehicle occupant protection device, an inflator, a retainer, a reaction plate, and at least one fastener. The inflatable vehicle occupant protection device has a portion defining an inlet opening. The inflator has a housing and a mounting flange. The housing extends through the inlet opening into the vehicle occupant protection device. The mounting flange projects from the housing. The retainer is located in the vehicle occupant protection device and extends circumferentially around the housing. The reaction plate has a base portion and at least one spring finger attached to the base portion. The spring finger has a support surface for engaging a first side of the mounting flange. The fastener secures the retainer, the protection device, and the reaction plate together as an assembly. In the assembly, a first surface portion of the retainer clamps the portion defining the inlet opening against a second side of the mounting flange and a second surface portion of the retainer clamps the portion defining the inlet opening against the base portion of the reaction plate.

BRIEF DESCRIPTION OF THE DRAWINGS

The foregoing and other features of the present invention will become apparent to one skilled in the art upon reading the following description of the present invention with reference to the accompanying drawings, wherein.

DESCRIPTION OF A PREFERRED EMBODIMENT

Figures 1, 2:
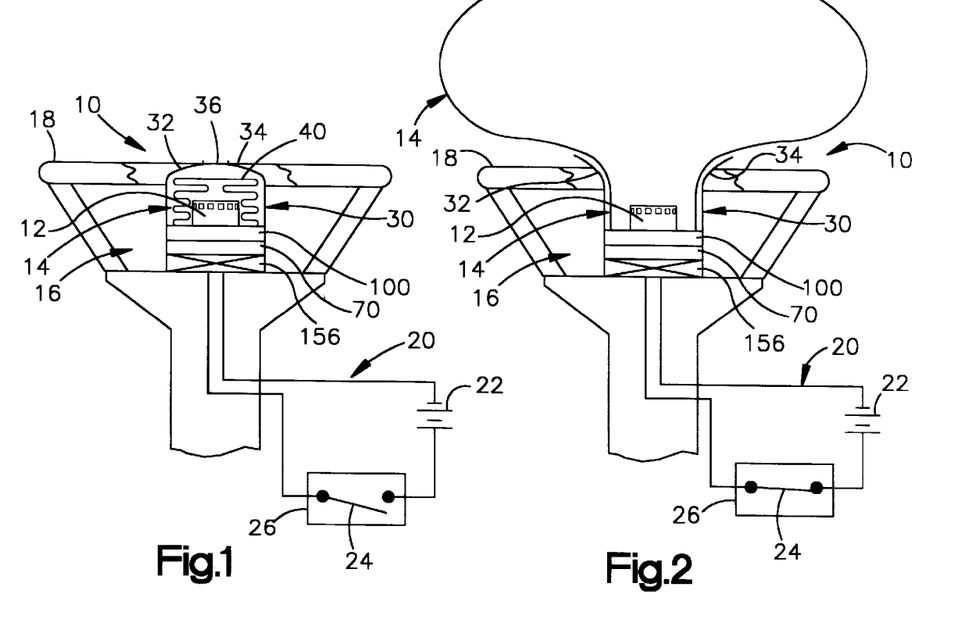
FIG. 1 is a schematic view of a vehicle occupant protection apparatus.
FIG. 2 is a schematic view showing the apparatus of FIG. 1 in an actuated condition.

A vehicle occupant protection apparatus 10 is shown schematically in FIGS. 1 and 2. The apparatus 10 includes an inflator 12 and a particular type of inflatable vehicle occupant protection device 14 which is commonly referred to as an air bag. The air bag 14 and the inflator 12 are parts of an air bag module 16 which can be mounted on a vehicle steering wheel 18.

The air bag 14 is inflatable from a folded, uninflated condition, as shown in FIG. 1, to an unfolded, inflated condition, as shown in FIG. 2. When the air bag 14 is being inflated, it moves toward the driver of the vehicle. The air bag 14 then restrains movement of the driver toward the steering wheel 18 to help protect the driver from a forceful impact with the steering wheel 18 or other parts of the vehicle.

The inflator 12 is an electrically actuatable source of inflation fluid for inflating the air bag 14. In the preferred embodiment of the present invention, the inflator 12 contains an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid Further, the inflator 12 could alternatively be mechanically actuated.

When the air bag module 16 is installed on the steering wheel 18, the inflator 12 is included in an electrical circuit 20 with a power source 22 and a normally open switch 24. The power source 22 is preferably the vehicle battery. The switch 24 is part of a sensor 26 which senses a condition indicating the occurrence of a vehicle collision. Such a condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 14 is desired to restrain movement of the driver of the vehicle, as described above. The switch 24 then closes, and electric current is directed through the inflator 12 to actuate the inflator 12. As a result, the inflator 12 rapidly emits a large volume of inflation gas which flows into the air bag 14 to inflate the air bag 14.

Another part of the air bag module 16 is a cover 30 which encloses the air bag 14 and the inflator 12. The cover 30 is made of a pliable plastic material which may have any suitable composition known in the art. The cover 30 includes first and second deployment door panels 32 and 34 which extend over the air bag 14. The deployment door panels 32 and 34 are held in closed positions, as shown in FIG. 1, by a rupturable section 36 of the cover 30. As the inflation gas emitted from the inflator 12 begins to inflate the air bag 14, it moves the air bag 14 forcefully outward against the cover 30. The air bag 14 then ruptures the rupturable section 36 of the cover 30 and moves the deployment door panels 32 and 34 pivotally outward, as shown in FIG. 2. As the inflation gas continues to inflate the air bag 14, it moves the air bag 14 outward from the cover 30 past the deployment door panels 32 and 34. Although the cover 30 is shown as having two deployment door panels 32 and 34, it could alternatively have only a single deployment door panel or more than two deployment door panels.

In the schematic views of FIGS. 1 and 2, the air bag 14 is shown to have a major portion 40 and a portion 41 (FIG. 3) defining an inlet opening 144. When the air bag 14 is being inflated from the condition of FIG. 1 to the condition of FIG. 2, the major portion 40 of the air bag 14 moves outward from the cover 30 toward the driver of the vehicle. The portion 41 of the air bag 14 is retained with the inflator 12.

Figure 3:
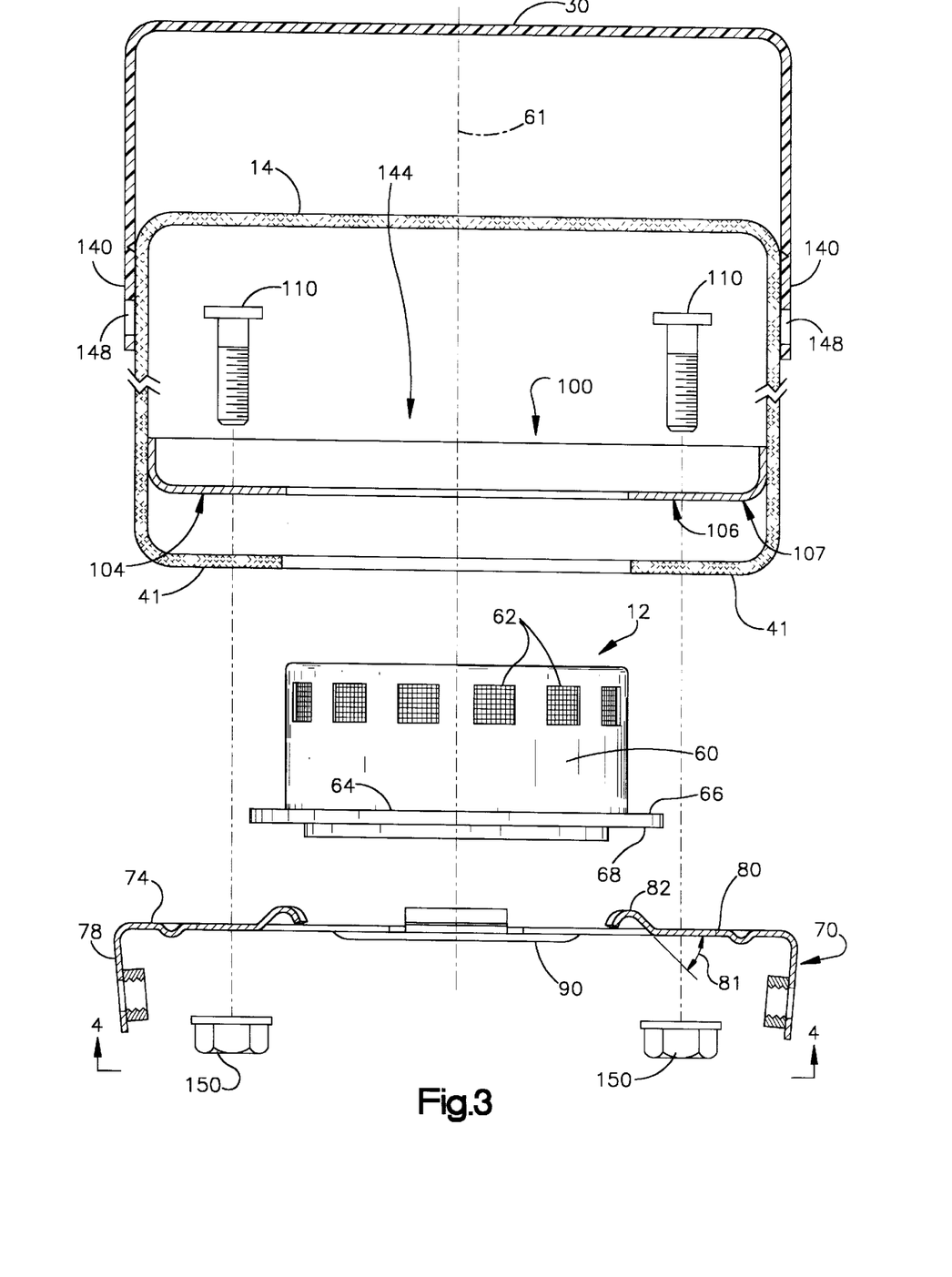
FIG. 3 is an exploded side view of parts of an apparatus in accordance with a first embodiment of the present invention.

As shown in greater detail in FIG. 3, the inflator 12 has a cylindrical housing 60 with a central axis 61. A circumferentially extending array of gas outlet openings 62 is located near one end of the housing 60. An annular mounting flange 64 projects radially outward at the other end of the housing 60. The flange 64 has upper and lower sides 66 and 68, respectively, facing oppositely and away from each other along the axis 61. The housing 60, including the mounting flange 64, is formed of a substantially rigid metal material.

Figure 4:
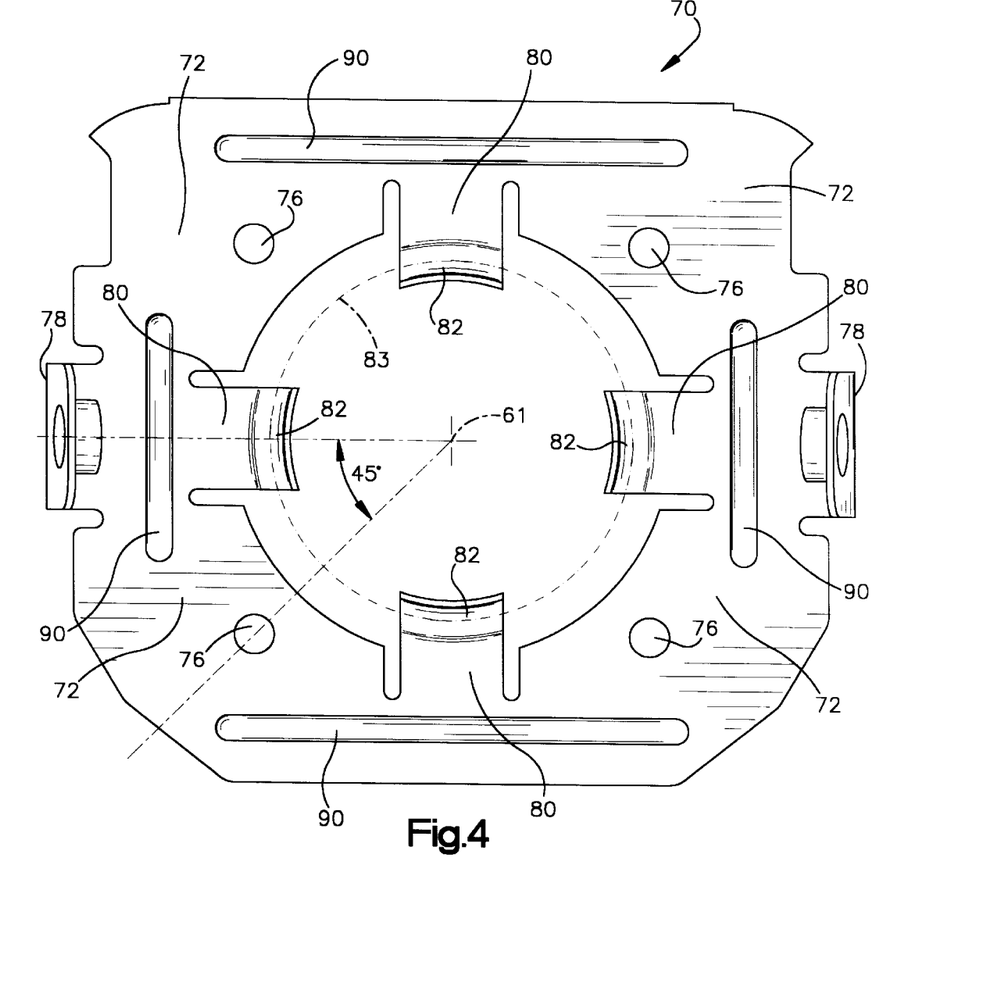
FIG. 4 is a view taken on line 4—4 of FIG. 3.

Also shown in FIG. 3 is a first embodiment of a reaction plate 70 for supporting the inflator 12 in the air bag module 16 (FIGS. 1 and 2). The reaction plate 70 is a unitary part comprising a single piece of stamped homogeneous metal. A base portion 72 of the reaction plate 70 has a circular central opening 71 (FIG. 4) and a generally square peripheral shape with rounded corners. An upper surface 74 of the base portion 72 of the reaction plate 70 lies in a plane perpendicular to the axis 61 of the inflator housing 60. The base portion 72 of the reaction plate 70 further has a rectangular array of four mounting openings 76 (FIG. 4). A pair of opposed mounting tabs 78 project axially downward, and radially inward, from the base portion 72 of the reaction plate 70.

As viewed in FIG. 4, four spring fingers 80 comprise flexible cantilevers which project radially inward from the base portion 72 of the reaction plate 70 into the central opening 71 towards the central axis 61. The spring fingers 80 are equally spaced apart circumferentially and are located as two diametrically opposed pairs about the central axis 61. The spring fingers 80 are circumferentially offset by 45 degrees from the mounting openings 76. A respective reinforcing rib 90 is located near the proximal end of each spring finger 80 to strengthen the reaction plate 70 against bending forces. There are four reinforcing ribs 90.

As viewed in FIG. 3, each spring finger 80 extends at an acute angle 81 upward from the plane of the upper surface 74 of the base portion 72 and has a support surface 82 which engages the lower side 68 of the mounting flange 64. The support surface 82 and the upper surface 74 of the base portion 72 of the reaction plate 70 are thus spaced axially apart from each other along the central axis 61. The support surfaces 82 lie on an arc 83 which is centered at the central axis 61. The distal end of each spring finger 80 is curved downward away from the support surface 82 to form a portion of a toroidal surface (FIGS. 3 and 4).

Figure 5:
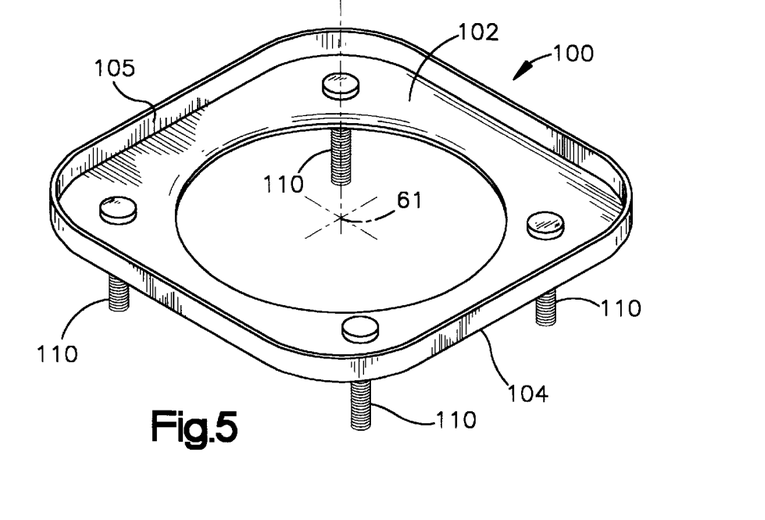
FIG. 5 is a perspective view of a part of the apparatus of FIG. 1.

As shown schematically in FIGS. 1 and 2, the air bag module 16 further includes a retainer 100. As shown in FIG. 5, the retainer 100 is a unitary, stamped metal part with a planar frame 102 centered on axis 61. A lower side 104 of the frame 102 lies in a plane perpendicular to the axis 61. Like the base portion 72 of the reaction plate 70, the frame 102 has a circular central opening and a generally square peripheral shape with rounded corners. The frame 102 is smaller, however, as measured between its opposite side edges, than the base portion 72 of the reaction plate 70.

A flange 105 projects axially upward from the periphery of the frame 102. As seen in FIG. 3, the lower surface 104 of the retainer 100 has a first surface portion 106 for extending circumferentially around the housing 60 and for clamping the inlet portion 41 of the air bag 14 and the mounting flaps 140 of the cover 30 against the upper side 66 of the mounting flange 64. The lower surface 104 of the retainer 100 has a second surface portion 107 for clamping the inlet portion 41 of the air bag 14 and the mounting flaps 140 of the cover 30 against the base portion 72 of the reaction plate 70.

Four fasteners 110 project axially downward from the frame 102, with each fastener 110 being located adjacent to a corresponding one of the four rounded corners of the frame 102. The fasteners 110 are thus arranged in a rectangular array corresponding to the rectangular array of openings 76 (FIG. 4) in the base portion 72 of the reaction plate 70.

Figure 6:
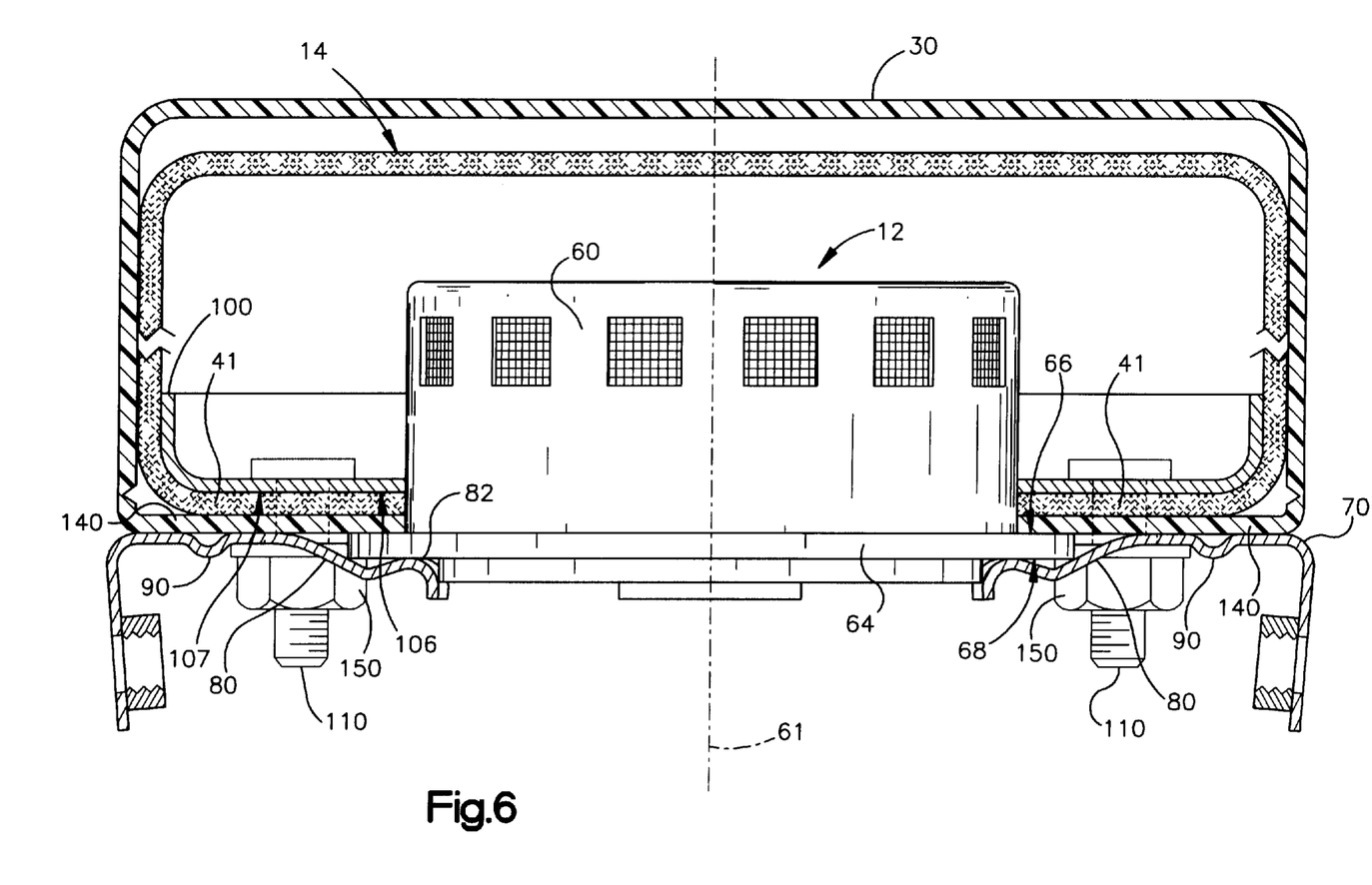
FIG. 6 is a sectional view of the apparatus of FIG. 3 in an assembled condition.

The foregoing parts of the air bag module 16 are shown assembled in FIG. 6. The inflator 12 and the inlet portion 41 of the air bag 14 are clamped between the reaction plate 70 and the retainer 100. More specifically, the lower side 68 of the mounting flange 64 of the inflator 12 lies against the support surfaces 82 of the spring fingers 80 of the reaction plate 70. Four mounting flaps 140 on the cover 30, two of which are shown in the side view of FIG. 6, also are clamped between the reaction plate 70 and the retainer 100. The inlet portion 41 of the air bag 14, the retainer 100, and the cover 30 have aligned openings for receiving the inflator 12.

The fasteners 110 on the retainer 100 project downward through openings in the air bag 14. The fasteners 110 also extend through openings 148 (FIG. 3) in the mounting flaps 140 of the cover 30, and further through the openings 76 in the base portion 72 of the reaction plate 70. When a corresponding plurality of nuts 150 are tightened onto the fasteners 110, the frame portion 102 of the retainer 100 is drawn axially downward toward the base portion 72 of the reaction plate 70. This causes the air bag 14, as well as the mounting flaps 140 of the cover 30, to become clamped axially between the lower surface 104 of the retainer 100 and the upper surface 74 of the base portion 72 of the reaction plate 70.

When the nuts 150 are tightened onto the fasteners 110, the spring fingers 80 are pressed forcefully against the lower side 68 of the mounting flange 64. This holds the mounting flange 64, the inlet portion 41 of the air bag 14, and the mounting flaps 140 of the cover 30 firmly between the first surface portion 106 of the retainer 100 and the reaction plate 70. In this manner, the spring fingers 80 may be deflected so as to permit the frame 102 of the retainer 100 to move axially toward the base portion 72 of the reaction plate 70. The spring fingers 80 may remain stressed under the influence of the axially directed clamping force so as to exert a spring bias against the mounting flange 64 as an axially directed force. The mounting tabs 78 on the reaction plate 70 may be used with fasteners (not shown) to mount the interconnected parts of FIG. 6 on the vehicle steering wheel, steering column, or on a part secured to the vehicle steering wheel, such as a spring loaded horn switch assembly 156 (FIGS. 1 and 2), in a known manner.

Figure 7:
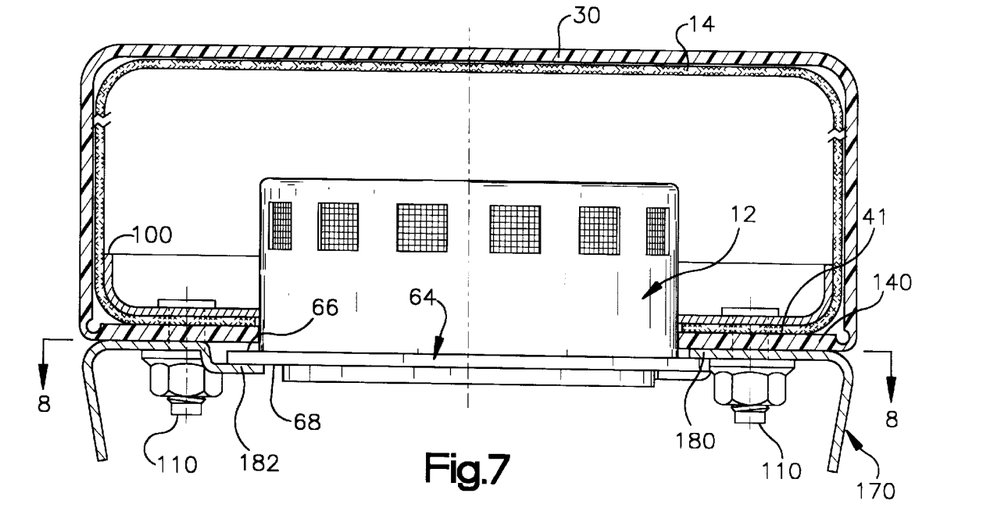
FIG. 7 is a sectional view similar to FIG. 6 of a second embodiment of the present invention.

In the embodiment of FIG. 7, the reaction plate 70 does not clamp the upper surface 66 of the mounting flange 64 of the inflator 12 against the mounting flaps 140, portion 41 of the air bag 14, and the retainer 100 as in the embodiment of FIG. 6. Instead, a reaction plate 170 has two sets 180, 182 of three spring fingers to secure the inflator 12 to the reaction plate 170. The spring fingers 180, 182 extend radially into a central circular opening through the reaction plate 170.

The spring fingers 180 are centered on radii of the central opening which are 120° apart. The spring fingers 182 are also centered on radii of the central opening which are 120° apart and circumferentially offset 60° from the radii on which the spring fingers 180 are centered. The first set 180 of spring fingers is also axially offset from the second set 182 of spring fingers. The first set 180 of spring fingers clamps against the upper surface 66 of the mounting flange 64. The second set 182 of spring fingers clamps against the lower surface 68 of the mounting flange 64.

Figure 8:
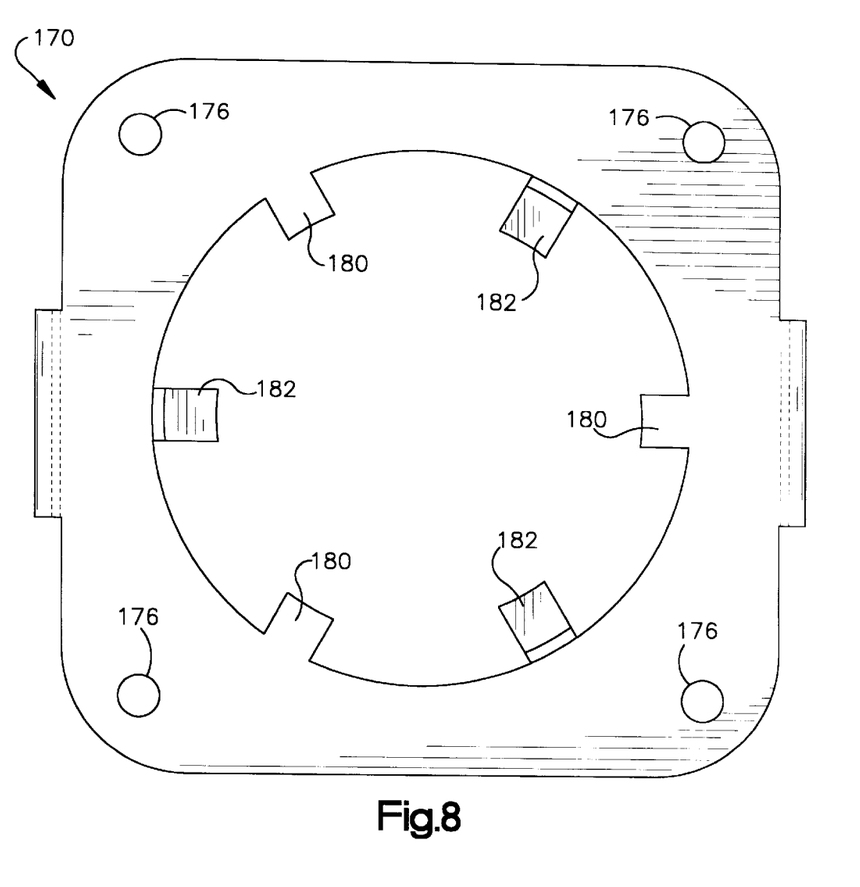
FIG. 8 is a view taken on line 8—8 of FIG. 7 with parts removed.

The inflator 12 and the reaction plate 170 are assembled in an initial step before the fasteners 110 are inserted into the mounting holes 176 (FIG. 8) and the entire apparatus is assembled. The mounting flange 64 of the inflator 12 is inserted between the two sets 180, 182 of spring fingers into the position shown in FIG. 7. The two sets 180, 182 of spring fingers elastically deflect as the mounting flange 64 is inserted. The spring fingers 180, 182 then spring back to secure the mounting flange 64 between the two sets 180, 182 of spring fingers.

Alternatively, the flange 64 of the inflator 12 can be provided with notches (not shown) spaced circumferentially around the flange 64. The flange 64 would then be assembled with the reaction plate 170 by moving the inflator 12 axially and passing one of the sets 180 or 182 of fingers through the notches. Rotating the inflator 12 through an arc of about 30° would cause both sets 180 and 182 of fingers to engage the flange 64.

Figure 9:
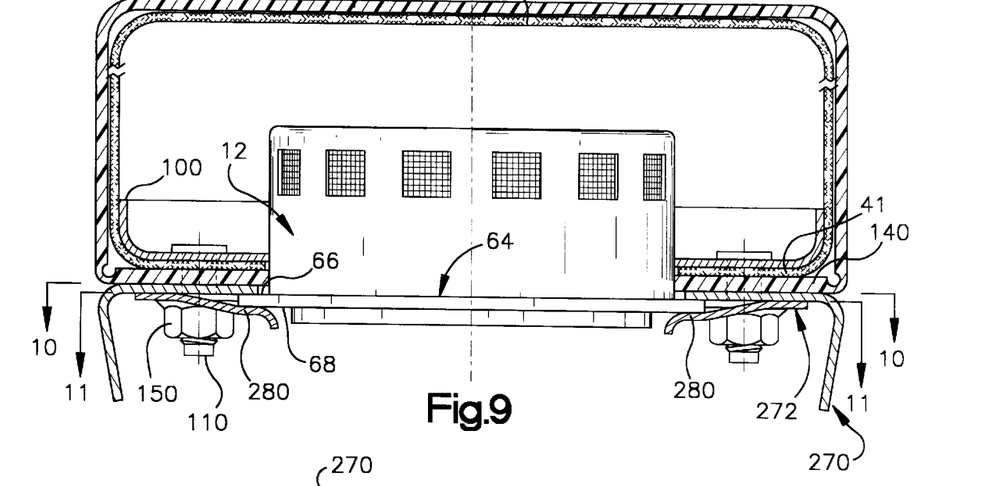
FIG. 9 is a sectional view similar to FIG. 6 of a third embodiment of the present invention.
Figure 10:
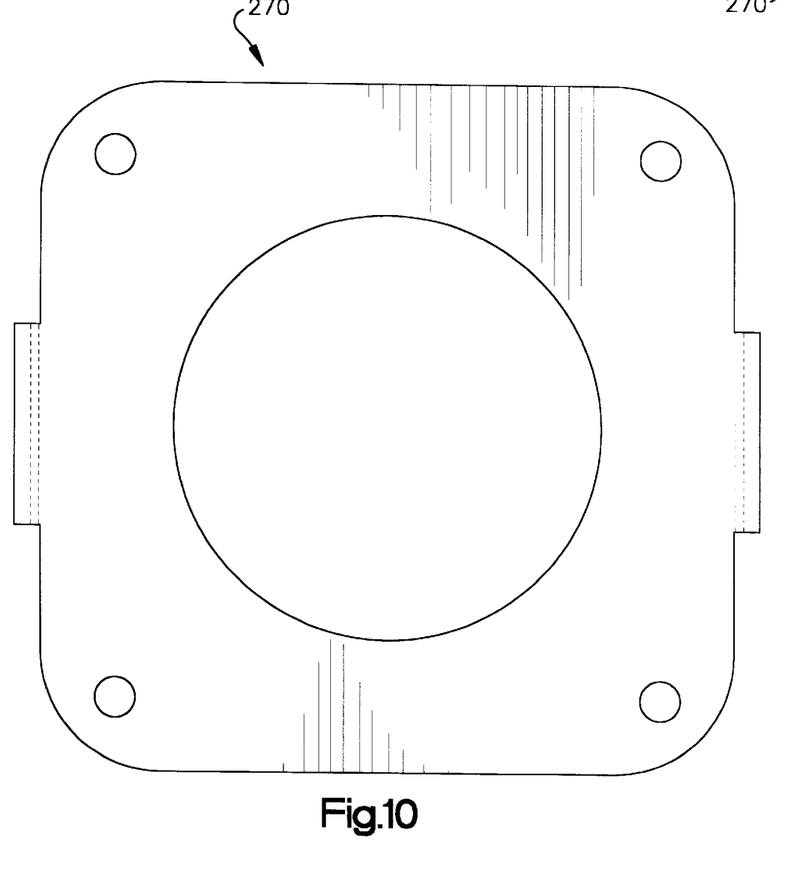
FIG. 10 is a view taken on line 10—10 of FIG. 9 with parts removed.
Figure 11:
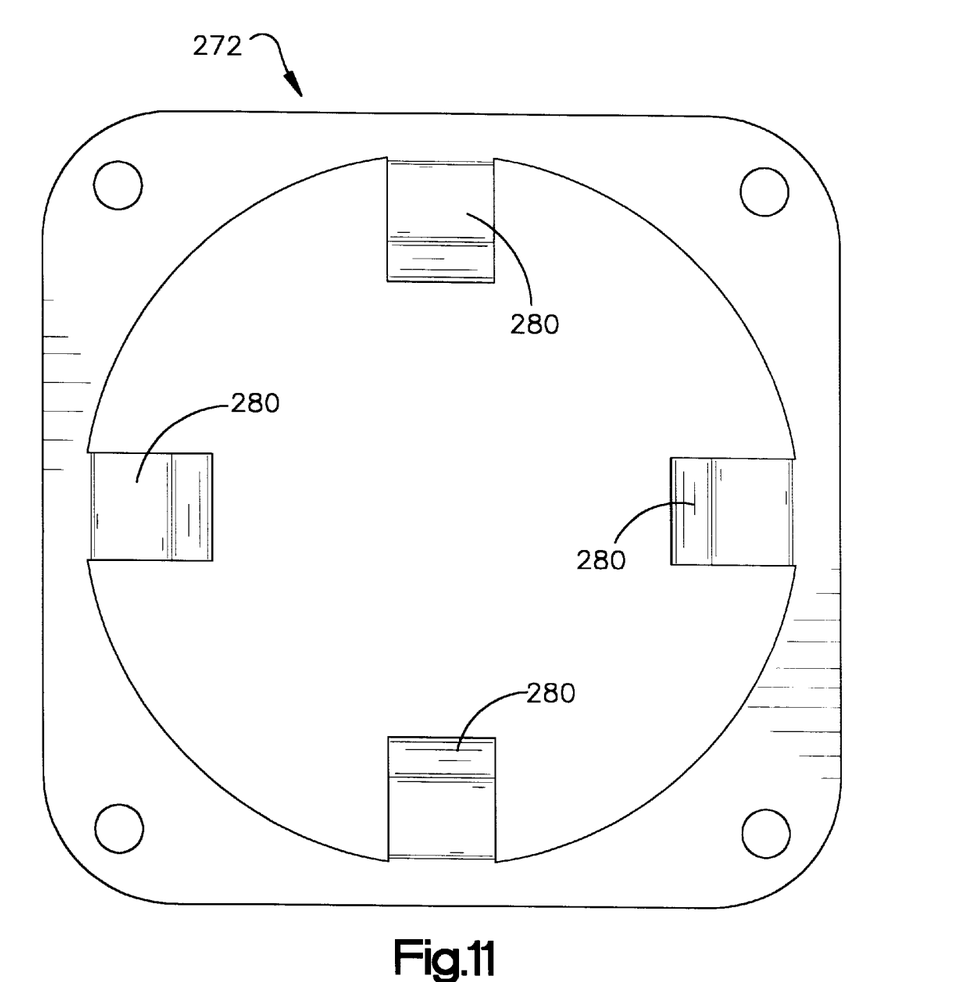
FIG. 11 is a view taken on line 11—11 of FIG. 9 with parts removed.

FIG. 9 illustrates a third embodiment of the invention in which the reaction plate 70 also does not clamp the upper surface 66 of the mounting flange 64 of the inflator 12 against the mounting flaps 140, portion 41 of the air bag 14, and the retainer 100. Instead, a reaction plate 270 (FIG. 10) clamps against the upper surface 66 of the mounting flange 64 and a spring plate 272 (FIG. 11) clamps against the lower surface 68 of the mounting flange 64 as the nuts 150 are tightened onto the fasteners 110.

The spring plate 272 is secured to the reaction plate 270 by the nuts 150 on the fasteners 110. Four spring fingers 280 on the spring plate 272 comprise cantilevers projecting radially inward relative to a central opening through the reaction plate 270 (FIG. 9). The spring fingers 280 are pressed forcefully against the lower surface 68 of the mounting flange 64 when the nuts 150 are tightened onto the fasteners 110.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   an inflatable vehicle occupant protection device having a portion defining an inlet opening;
   an inflator having a housing and a mounting flange projecting from said housing, said housing extending through said inlet opening into said vehicle occupant protection device;
   a retainer for location in said vehicle occupant protection device and for extending circumferentially around said housing;
   a reaction plate having a base portion and at least one spring finger attached to said base portion, said spring finger having a support surface for engaging a first side of said mounting flange; and
   at least one fastener for securing said retainer, said protection device, and said reaction plate together as an assembly with a first surface portion of said retainer engaging and clamping said portion defining said inlet opening against a second side of said mounting flange and a second surface portion of said retainer clamping said portion defining said inlet opening against said base portion of said reaction plate.

2. The apparatus as defined in claim 1 wherein said at least one spring finger extends at an acute angle from said base portion.

3. The apparatus as defined in claim 1 wherein said at least one fastener extends through aligned openings in said retainer and said protection device.

4. The apparatus as defined in claim 1 wherein said reaction plate has at least two diametrically opposed spring fingers which project away from said base portion.

5. The apparatus as defined in claim 4 wherein said reaction plate includes four spring fingers which project away from said base portion and which are equally spaced apart circumferentially.

6. The apparatus as defined in claim 4 wherein said spring fingers are cantilevers.

7. The apparatus as defined in claim 1 further comprising a cover for said protection device, said cover having at least one mounting flap, said at least one fastener securing said at least one mounting flap between said protection device and said base portion of said reaction plate.

8. The apparatus as defined in claim 1 wherein said inflator has a central axis and said at least one spring finger extends from said base portion radially inward toward said central axis.

9. The apparatus as defined in claim 8 wherein said support surface of said spring finger lies on an arc which is centered on said central axis.

10. The apparatus as defined in claim 9 wherein a distal portion of said spring finger forms a portion of a toroidal surface.

11. The apparatus as defined in claim 1 wherein said inflator has a central axis, and said support surface of said spring finger and said base portion of said reaction plate are spaced axially apart from each other along said central axis.

12. The apparatus as defined in claim 11 wherein said reaction plate has at least one opening for said at least one fastener, said opening and said spring finger circumferentially offset around said central axis by 45 degrees.

13. An apparatus comprising:

an inflatable vehicle occupant protection device having a portion defining an inlet opening;

a cover for said protection device, said cover having at least one mounting flap;

an inflator having a housing and a mounting flange projecting from said housing, said housing extending through said inlet opening into said vehicle occupant protection device;

a retainer for location in said vehicle occupant protection device, said retainer extending circumferentially around said housing and engaging said portion defining said inlet opening;

a reaction plate having a base portion and at least one spring finger attached to said base portion, said base portion engaging said mounting flap, said spring finger having a support surface for engaging said mounting flange, and at least one fastener for securing said retainer, said protection device, said mounting flap, said inflator, and said reaction plate together with said base portion clamping against said mounting flap and said support surface clamping against said mounting flange.

14. The apparatus as defined in claim 13 wherein said inflator has a central axis and said base portion has a plurality of spring fingers which are spaced from each other circumferentially about said central axis.

15. The apparatus as defined in claim 13 wherein said reaction plate includes at least two mounting tabs for securing said apparatus to a vehicle.

16. The apparatus as defined in claim 13 wherein said reaction plate includes at least one rib for strengthening said reaction plate against bending forces.

17. The apparatus as defined in claim 13 wherein said cover includes a rupturable section for facilitating deployment of said protection device.

* * * * *